Feb. 25, 1969 S. J. LAWRENCE 3,429,216
MUSIC-NOTE INDICATING DEVICE
Filed April 26, 1966
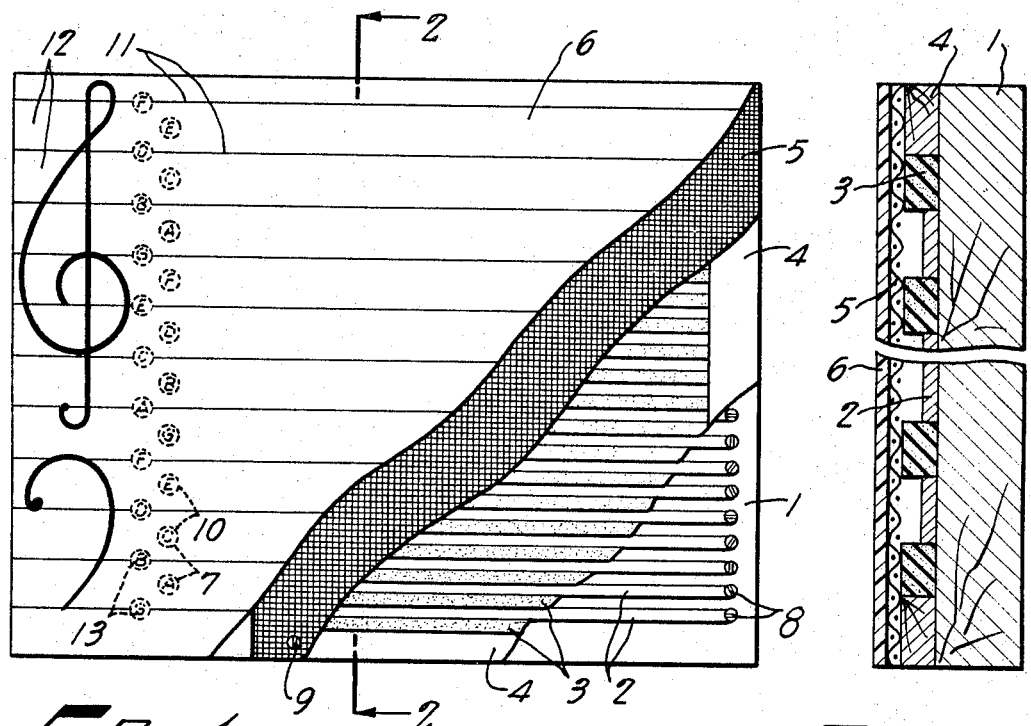
FIG_1
FIG_2
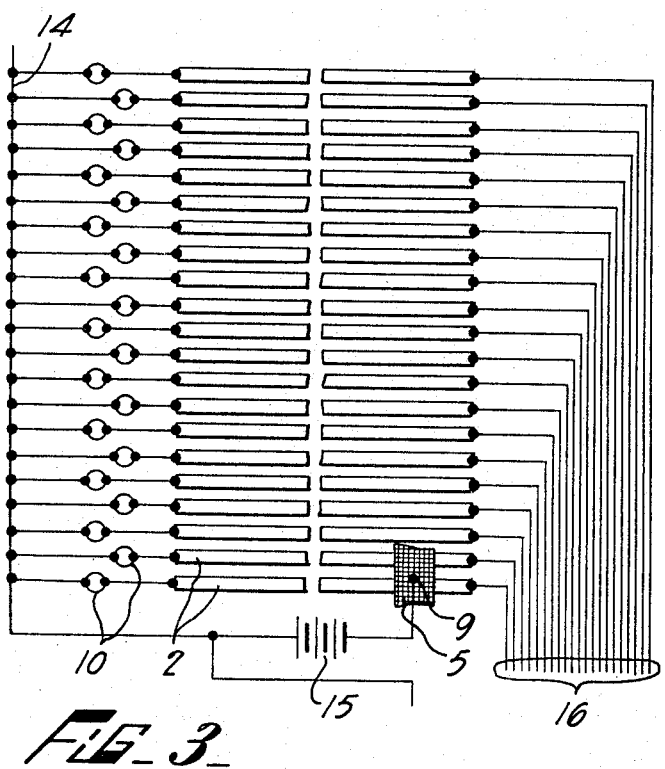
FIG_3
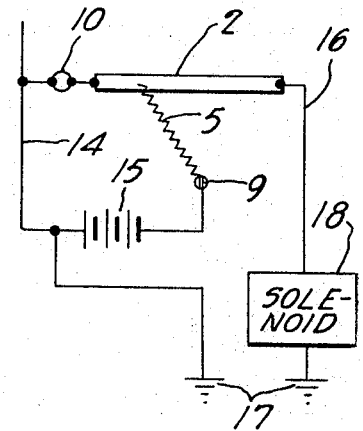
FIG_4
INVENTOR.
SIDNEY J. LAWRENCE
BY
Robert Berliner
ATTORNEY.

United States Patent Office 3,429,216
Patented Feb. 25, 1969

3,429,216
MUSIC-NOTE INDICATING DEVICE
Sidney J. Lawrence, 229 Oakford St.,
West Hempstead, N.Y. 11552
Filed Apr. 26, 1966, Ser. No. 545,472
U.S. Cl. 84—471            20 Claims
Int. Cl. G09b 15/02, 15/00

ABSTRACT OF THE DISCLOSURE

A music-note indicating device wherein a panel of music staff indicia is selectively associated with electrical transmission means and note indicating means so that selective contact of the panel results in sounding and/or visual display of an appropriate note.

---

This invention relates to an educational music-note indicating device and embodies novel performance and construction characteristics.

It is well known among music educators that a large percentage of beginning music students are confused in attempting to understand the function of music notation. Understanding the staff—with its lines and spaces—, the notes, black and white— with or without stems and flags—, often seem too complicated a task for these students to master. The beginning method books which introduce notation via a picture of a grand staff with notes placed stepwise diagonally up and down merely leave a fixed image of a pyramid and no understanding of their true meaning.

A primary problem in this respect is to relate the introduction of music notation to the sounds which notes represent. To insure basic music reading the student must come to understand that the entire length of each line or space on the staff on which a note is placed represents the pitch-tone (and the printed note itself actually only represens time-value). Students become confused because they have not clearly defined the differences of the function of the staff lines and spaces as compared to the printed note. Thus there is a need for a device which vividly depicts an entire staff line or space as representing a particular pitch tone, allowing the teacher to freely explain note time values. Further there is need for a device which, through simultaneous tactile, auditory and visual learning, clearly illustrates that differences in tone pitches are indicated by the number of lines and spaces between notes.

Accordingly, it is an object of this invention to provide a device which emphasizes the basic character of musical notation; that the line or space of a staff represents the corresponding sound. It is another object to provide a device which represents the staff as a sound generator and the notes as means for using the staff. Another object is to provide a device on which the horizontal lines and spaces of a staff are portrayed and which lines and spaces can be touched or depressed to yield an indication of the note represented by the line or space. A further object is to provide such indication in the form of an illuminated letter symbol of the note, in the form of the pitch tone represented, or both concurrently. Still another object is to provide a device that is simple in construction, and readily and cheaply manufactured, which selects electrical circuits to produce such an indication in correspondence to simple contact or depression of a staff line or space on a panel. Other objects and advantages of the invention will become apparent from the following description thereof.

The above and other objects are accomplished by providing a music-note indicating device comprising a panel having successive parallel lines and spaces in the form of a musical staff. Note indicating means are arranged to be actuated by depression or contact of a line or space and to thereby indicate a corresponding note. The note is indicated by illumination of a corresponding letter symbol on the panel, or by sounding the note, or preferably both concurrently.

The device itself operates by having a wire screen beneath the panel and overlaying a plurality of parallel metal strips which correspond to the spaces and lines on the panel. The screen is held away from the strips by strips of sponge rubber, or other deformable electrical insulator, alternating with the metal strips. One end of each metal strip is connected to a bulb which sits beneath a lettered symbol of the corresponding note on the panel. The other end of the metal strip is connected to a solenoid which is poised to strike a piano key, or is connected directly to the appropriate tube in an electric piano or organ. The light bulb and solenoid (or other sounding means) are connected in parallel to one polarity of a power source, the wire screen to the other polarity. By pressing on the panel, the wire screen is pressed into contact with the metal strip immediately thereunder to close the circuit, whereby the bulb illuminates the letter-symbol of the note corresponding to the staff line or space direcly above the contacted metal strip. The solenoid, or other sound producer, is concurrently actuated to sound that note.

A more detailed statement of specific aspects of the invention will be given with reference to the drawings, which are not to scale and in which:

FIG. 1 is a plan, partially cut away, view of one form of device embodying the invention;

FIG. 2 is a sectional view along the line 2—2 of FIG. 1;

FIG. 3 is a schematic view of the wiring of the device of FIG. 1; and

FIG. 4 is a partially schematic, partially diagrammatic, view of one circuit formed in operation of the device of FIG. 1.

Referring to FIGS. 1 and 2, the device comprises a rectangualr base 1, in this case constructed of ¾ inch plywood with dimensions of 3 by 9 feet, on which are secured twenty-one ½ inch wide copper strips 2, each representing a line or space of a grand staff. The copper strips 2 run along the length of the base 1 from a margin on the right side of about 3 inches to a margin of about 17 inches on the left side. Twenty-two sponge rubber strips 3, each ⅜ inch wide and ³⁄₁₆ inch thick, separate the copper strips 2 and are secured alternating therewith on the base 1. A frame or mask 4, of ⅛ inch plywood, is secured around the edges of the base 1 leaving a "sight" of about 2.5 by 7.3 feet. A copper screen or mesh 5 overlays the copper and rubber strips 2 and 3 and the "sight" of mask 4 and is secured to the mask 4. A 3 by 9 feet sheet of white plastic insulating panel, ⅛ inch thick, overlays the wire screen 5 and left side of the mask 4. Twenty-one staggered socket holes 7, of 1 inch diameter, are drilled through the left side of the mask 4 and base 1.

The copper strips 2 are secured to the base 1 by current conducting bolts 8 running through the thickness of the base 1 and extending somewhat beyond. The copper screen 5 has a bolt 9 at its lower edge extending through the mask 4 and base 1 and somewhat beyond. Twenty-one 24 volt light bulbs 10 are seated and secured in the socket holes 7. The panel 6 is somewhat translucent and has successive parallel lines 11 and spaces 12 portrayed thereon in musical staff relation and representing a grand staff. The socket holes 7 and bulbs 10 are arranged to lie alternately on the lines 11 and spaces 12. Letter-symbols 13 are affixed to the underside of the panel 6, each over the appropriate bulb and representing the corresponding musical note. The copper strips 2 are aligned beneath corresponding lines 11 and spaces 12.

FIG. 3 schematically shows the wiring and circuitry of the device. The left end of each copper strip 2 is connected to one terminal of its mating light bulb 10. The other terminal of each bulb 10 is connected through the socket hole 7 to a common wire 14 which is connected to a source of electrical power, in this case a 24 volt battery 15, and from there to a ground 17. The right end of each copper strip 2 is connected to a lead wire 16 for that strip which is connected to a solenoid (not shown in FIG. 3) which, in turn, is connected to ground 17. The solenoids are placed over the keyboard of a piano and arranged so that upon actuation the appropriate key is struck. The other terminal of the battery 15 is connected to the copper screen 5 by means of bolt 9. The electrical connections to the copper strips 2 and screen 5 are secured by nuts tightened on the securing bolts 8 and 9.

Referring to FIG. 4, operation of the device for a typical circuit thereof is illustrated. By depressing a line 11 or space 12 on the panel 6, the screen 5 is made to contact the copper strip 2 that corresponds to the staff position of that line or space, thereby forming two parallel circuits. One circuit is formed with the screen 5, a copper strip 2, a bulb 10 and the battery 15; and another is formed with the screen 5, that copper strip 2, a solenoid 18 and the battery 15. Accordingly, by depressing a line 11 or space 12 on the panel 6, the bulb 10 under the letter-symbol 13 designating that note is lit, displaying its letter-symbol, and, concurrently, the note is sounded by the solenoid 18.

By means of my invention, even very young children can learn notation more quickly and with greater ease and comprehension than heretofore possible. The student is faced with a blank, empty grand staff. He doesn't know the name or sound of a note until he presses a line or space with his finger or a "dummy" solid note. Only then does he hear the sound and see the note name flash on. That he can press anywhere on the length of the line or space is of critical importance; he quickly learns that the space or line represents a sound, not the black object, the note. Further, by moving his hands up and down to sound out different notes he quickly learns that sounds move in exactly that manner. Thus he discovers pitch direction, and since he can move vertically, obliquely up and down, and in any direction, he attains a clear concept of the "pitch pictures" that groups of notes can make. Further, in teaching interval spacing, i.e., steps and skips, the student learns that "line to line" represents a skip, as well as "space to space." In a six weeks test with six, five and six year old children of average music ability and training, a concept of pitch direction and spacing was achieved comparable with that learned in a year by prior teaching methods.

The device is described above using solenoids to produce the appropriate sound, the solenoids being placed over the keys of a piano. Other sounding means can be used; for example, the lead wires 16 can be readily connected to the appropriate tubes of an electric piano or organ, to a variable frequency oscillator or to any suitable sounding means. Using another set of solenoids for the black notes of the piano and an appropriate switching means, the current can be diverted to those solenoids to produce sharp or flat notes. Thus one push button can divert the current to a sharp, another to a flat and a third to return to the white notes. The teacher would press the required button when he wanted the sharp or flat to be heard, and the student would press the same line or space to get the sound, just as it appears on the music page.

Another variation within the scope of the invention is to replace the screen 5 with microswitches over the copper strips 2. By proper placement, current can be conducted through the strips when pressure is applied at any point along the length of the line. Similarly, the metal strips may be placed in slots with spring retainers and a hand-held magnet used to bring the strip in contact with the screen when the magnet is placed on the panel. Other current conductors can, of course, be used in place of copper and other material in place of the rubber strips 3 and plastic panel 6. Still other modifications and variations may be effected without departing from the spirit and scope of the novel concepts of this invention.

I claim:
1. A music-note indicating device comprising:
    a member bearing lines and spaces in representation of a music staff, said lines extending for a distance substantially greater than the separation between adjacent ones thereof to define said spaces;
    note indicating means; and
    switching means, operatively associated with said note indicating means, comprising opposed electrical contact means extending continuously for said distance and closing in response to manual contact of a line or space at any point thereon along said distance to actuate the note indicating means in correspondence to said contact, and opening upon release of said manual contact.
2. The device of claim 1 wherein the note indicating means comprises a plurality of letter symbols of notes associated with the panel in appropriate staff relationship, each letter symbol corresponding to a particular line or space and illuminable in response to contact of the corresponding line or space.
3. The device of claim 2 wherein the note indicating means causes concurrent sounding of the note.
4. The device of claim 1 wherein the note indicating means causes the note to be sounded.
5. The device of claim 1 containing a plurality of electrical leads positioned in staff relationship with respect to said member, each corresponding to a particular line or space and connected to the note indicating means whereby contact of a line or space causes current to be supplied to the lead corresponding to the contacted line or space to thereby actuate the note indicating means.
6. The device of claim 5 wherein the note indicating means comprises a plurality of solenoids, each solenoid corresponding to a particular line or space and actuated in response to contact of the corresponding line or space to cause the production of the sound.
7. A music-note indicating device comprising:
    a panel having successive parallel lines and spaces positioned in music staff relation thereon,
    note indicating means comprising a plurality of letter symbols of notes associated with the panel in appropriate staff relationship, each letter symbol corresponding to a particular line or space, and
    a plurality of electrical leads positioned in staff relationship with respect to the panel, each corresponding to a particular line or space and connected to the note indicating means, whereby contact of a line or space causes current to be supplied to the lead corresponding to the contacted line or space to thereby actuate the note indicating means, the corresponding letter symbol being illuminable in response to said contact.
8. The device of claim 7 wherein the note indicating means produces a sound corresponding to, and concurrently with illumination of, the letter symbol.
9. A music-note indicating device comprising:
    a base;
    a plurality of successive electrical leads in the form of parallel metal strips on the base;
    a panel having a plurality of successive lines and spaces positioned in music staff relation thereon, said lines extending for a distance substantially greater than the separation between adjacent ones thereof to define said spaces, each line and space corresponding to a particular metal strip;
    strip contacting means between the metal strips and the panel and separated from the metal strips in open circuit relation therewith, said strips and strip contacting means extending continuously for said dis- tance, said strip contacting means being capable of separately contacting the succession of metal strips to form therewith a succession of closed electrical circuits, whereby manual pressure on a particular line or space, at any point thereon along said distance, causes the strip contacting means to form said circuit with the corresponding strip; and music-note indicating means operative on formation of said closed circuit to indicate a music-note corresponding to the staff position of the particular line or space.

10. The device of claim 9 wherein the contacting means is separated from the metal strip by strips of electrically insulating material alternating on the base with the metal strips.

11. The device of claim 10 wherein the contacting means is in the form of a screen.

12. The device of claim 11 wherein the insulating material is deformable, thereby allowing a portion of the screen to be pressed into contact with a metal strip to form a closed electrical circuit when a corresponding line or space on the panel is pressed.

13. A music-note indicating device comprising a base, a panel having successive lines and spaces positioned in music staff relation thereon, a plurality of electrical leads in the form of parallel metal strips on the base, each corresponding to a particular line or space, strip contacting means between the metal strips and the panel and separated from the metal strips in open circuit relation therewith whereby pressure on a particular line or space on the panel causes the strip contacting means to contact and form a closed electrical circuit with the corresponding strip, and note indicating means electrically connected to the strips and contacting means and comprising a plurality of letter symbols of notes associated with the panel in appropriate staff relationship, each letter symbol corresponding to a particular line or space and illuminable in response to formation of the closed circuit.

14. The device of claim 13 wherein the note indicating means produces a sound corresponding to, and concurrently with illumination of, the letter symbol.

15. The device of claim 14 wherein the contacting means is separated from the metal strip by strips of electrically insulating material alternating on the base with the metal strip.

16. The device of claim 15 wherein the contacting means is in the form of a screen.

17. The device of claim 16 wherein the insulating material is deformable, thereby allowing a portion of the screen to be pressed into contact with a metal strip to form a closed electrical circuit when a corresponding line or space on the panel is pressed.

18. A music-note indicating device comprising:

a panel having successive parallel lines and spaces positioned in music staff relation thereon, said lines extending for a distance substantially greater than the separation between adjacent ones thereof to define said spaces;

note indicating means; and actuating means comprising spaced apart opposed electrical conductors completely underlying the panel, said opposed conductors extending continuously for said distance and closing in response to manual contact exteriorly of the panel at any point thereon along said distance to form a closed circuit to actuate the note indicating means in correspondence to said contact and opening upon release of said manual contact.

19. A music-note indicating device, comprising:

a member bearing lines and spaces in representation of a musical staff;

note indicating means comprising a plurality of letter symbols and means for selectively illuminating said letter symbols, each letter symbol corresponding to a particular line or space of said staff; and means responsive to contact of a line or space of said member to operate said illuminating means to illuminate a corresponding letter symbol.

20. The device of claim 19 wherein the note indicating means produces a sound corresponding to, and concurrently with illumination of, the letter symbol.

References Cited

UNITED STATES PATENTS

| 2,583,813 | 1/1952 | Burke | 200—86 |
| 2,783,327 | 2/1957 | Luckey | 200—86 |
| 3,308,253 | 3/1967 | Krakinowski | 200—46 |
| 972,934 | 10/1910 | Skoog | 84—477 |
| 1,137,394 | 4/1915 | Fowler | 84—470 |
| 1,268,376 | 6/1918 | Miessner et al. | 84—477 |
| 1,392,766 | 10/1921 | Huth | 84—470 |
| 1,821,311 | 9/1931 | Lamp | 84—478 |
| 2,353,001 | 7/1944 | Armbruster | 84—477 |
| 3,256,765 | 6/1966 | Siegel | 84—478 |

FOREIGN PATENTS

| 388,675 | 6/1965 | Switzerland. |
| 451,411 | 2/1913 | France. |
| 442,226 | 2/1936 | Great Britain. |
| 451,421 | 8/1936 | Great Britain. |
| 325,498 | 12/1957 | Switzerland. |

ROBERT S. WARD, JR., *Primary Examiner.*

U.S. Cl. X.R.

84—477, 483